United States Patent [19]

Cho

[11] Patent Number: 5,200,990
[45] Date of Patent: Apr. 6, 1993

[54] METHOD OF RECOVERING SPEECH PATH OF PRE-ENGAGED CALL ON RESTARTING KEYPHONE EXCHANGE SYSTEM

[75] Inventor: Seung-Hwan Cho, Seoul, Rep. of Korea

[73] Assignee: Samsung Electronics Co., Ltd., Suwon, Rep. of Korea

[21] Appl. No.: 802,277

[22] Filed: Dec. 4, 1991

[30] Foreign Application Priority Data

Jun. 17, 1991 [KR]  Rep. of Korea ............... 1991 9981

[51] Int. Cl.$^5$ ..................... H04M 3/18; H04M 1/72
[52] U.S. Cl. .................................. 379/165; 379/246
[58] Field of Search ............... 379/165, 245, 246, 293

[56] References Cited

U.S. PATENT DOCUMENTS 5,031,210  7/1991  Taniguchi ........................... 379/165
5,042,065  8/1991  Kim ..................................... 379/165

Primary Examiner—Stafford D. Schreyer
Attorney, Agent, or Firm—Robert E. Bushnell

[57] ABSTRACT

A method of recovering a speech path of a pre-engaged call upon restarting a keyphone exchange system due to the occurrence of a system failure. The method includes the steps of initializing all hardware and all software except for a subscriber's table buffer of said keyphone exchange system when being generated a predetermined restarting signal of said system; initializing a variable number of ports in the communication control software as a given initial value; generating an address of a port number corresponding to said variable number of ports in said subscriber's table buffer; checking whether a talk bit of a line status word in a port corresponding to said port number is set or not, said line status word indicating the state of said port; obtaining a subscriber's port number from a line number buffer and an opposite subscriber's port number from an opposite party if said talk bit is set, said line number buffer storing said subscriber's port number and said opposite party storing said opposite subscriber's port number; and forming said speech path of said call by connecting said subscriber's port number in said line number with said opposite subscriber's port number in said opposite party.

19 Claims, 4 Drawing Sheets

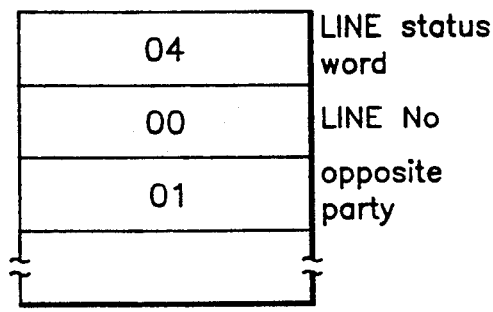
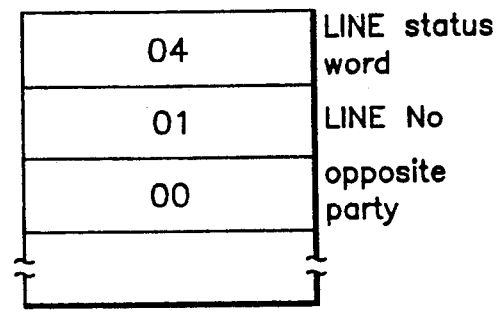
FIG. 4A
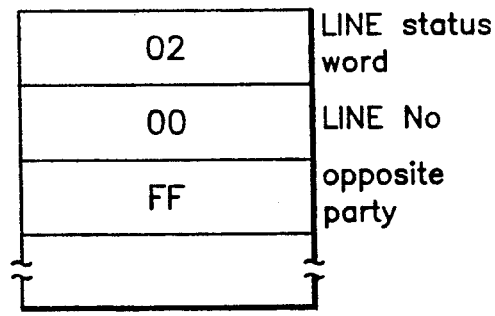
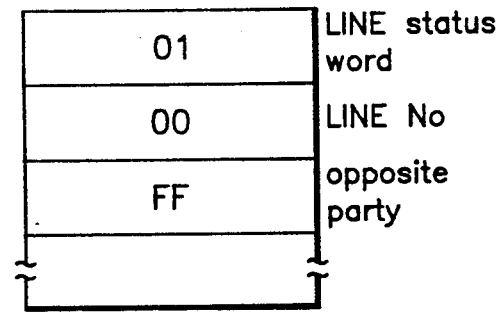
FIG. 4B         FIG. 4C

METHOD OF RECOVERING SPEECH PATH OF PRE-ENGAGED CALL ON RESTARTING KEYPHONE EXCHANGE SYSTEM

FIELD OF THE INVENTION

The present invention relates to a method of recovering a telephone call and more particularly to a method of recovering a pre-engaged call without disconnecting a speech path of the call upon restarting a keyphone exchange system due to the occurrence of a system failure.

TECHNICAL BACKGROUND OF THE INVENTION

Generally it is required for an exchange system not to disconnect a speech path of a pre-engaged call in any case. However the exchange system may be restarted in its entirety after the occurrence of a system failure due to its greatly complex mechanism comprised of hardware and software. In such a case, there may be a problem that a subscriber's speech path engaged in a preceding telephone call is disconnected because both the software and the hardware have to be initialized when restarting the system.

SUMMARY OF THE INVENTION

An object of the present invention is to provide a method of recovering a pre-engaged call without disconnecting a speech path of the call upon restarting a keyphone exchange system after the occurrence of a system failure.

According to the present invention, a method of recovering a pre-engaged call upon restarting a keyphone exchange system after the occurrence of a system failure includes the steps of initializing all hardware and all software except for a call buffer when a restarting grade of the system is a minor grade, generating the address of a corresponding port number for a variable number of port, set by a given value and checking whether a talk bit of a line status word is set or not, and connecting a speech path of the call by detecting a corresponding port number in a line number and an opposite port number engaged in a call of an opposite party in the case the talk bit is set in the third step.

The present invention will now be described more specifically with reference to the attached drawings only by way of example.

BRIEF DESCRIPTION OF THE ACCOMPANYING DRAWINGS

FIG. 1 is a block diagram of this inventive system;
FIG. 2 is a flow chart of system operation;
FIG. 3A is a table structure of a call buffer, and FIG. 3B is a structure of a line status word of a call buffer; and
FIG. 4A is a table structure of communication between port #1 and port #2, FIG. 4B is a table structure of port #1 being in a busy state, and FIG. 4C is a table structure of port #1 being in an idle state.

DETAILED DESCRIPTION OF CERTAIN EMBODIMENT

Figure 1:
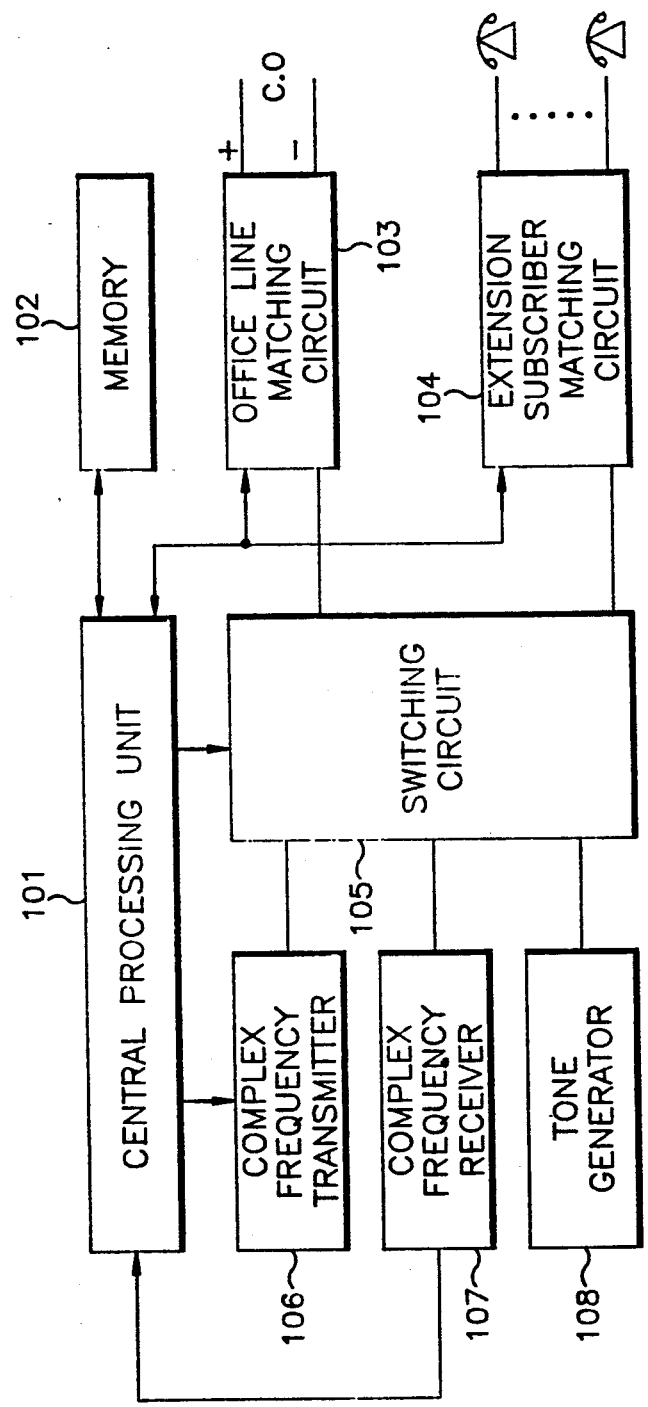

Referring to FIG. 1, there is shown an extension subscriber matching circuit 104 for detecting a hook on/off of an extension subscriber's telephone and supplying a current thereto. A memory 102 is to access or record certain data by a given control signal. A central processing unit 101 generates a control signal for allocating a time slot according to signalling information from the extension subscriber matching circuit 104 and accesses the memory 102. A complex frequency receiver 107 converts a dialed signal, from an extension subscriber telephone connected with the subscriber matching circuit 104, into a digital signal, and transmits it to the central processing unit 101. A complex frequency transmitter 106 generates a DTMF (Dual Tone Multi Frequency) by a digit data output of the central processing unit 101. A switching circuit 105 connects a speech path of an office line with the extension subscriber matching circuit 104 according to control by the central processing unit 101. An office line matching circuit 103 interfaces an office line of a central telephone office with the switching circuit 105. A tone generator 108 supplies various tones to an extension subscriber or an office line subscriber through the switching circuit 105.

Figure 2:
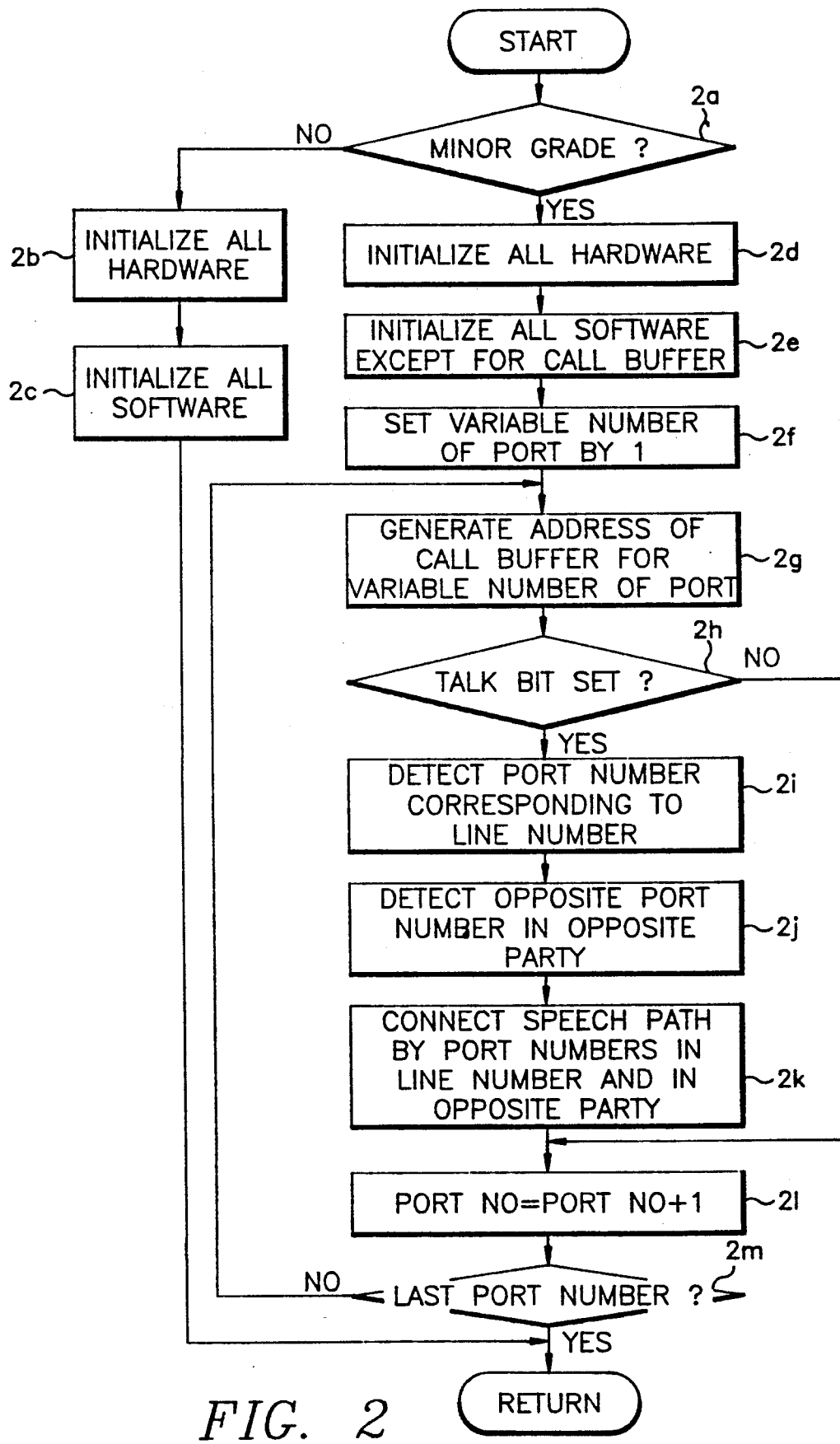

With reference to FIG. 2, the system operation comprises the steps of initializing all hardware and all software except for a call buffer in case of a minor restarting grade, generating an address of a corresponding port number for variable number of port, set by a given value and checking whether a talk bit of a line status word is set or not, connecting a speech path of a pre-engaged call by detecting corresponding port number in a line number and an opposite port number engaged in call of an opposite party in case of the talk bit being set in the above step, and detecting a last port number by repeating the steps beginning from the second step if the port number increased by 1 is not a last one after connecting the speech path of the call in the third step.

Figure 3A:
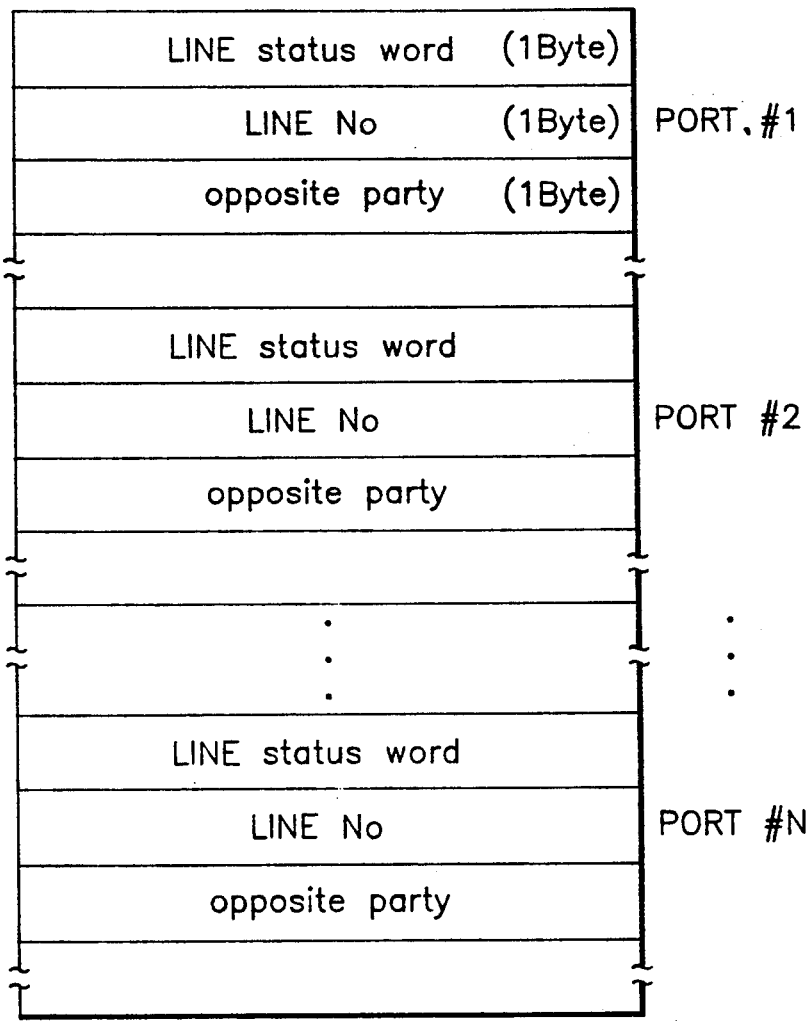
Figure 3B:
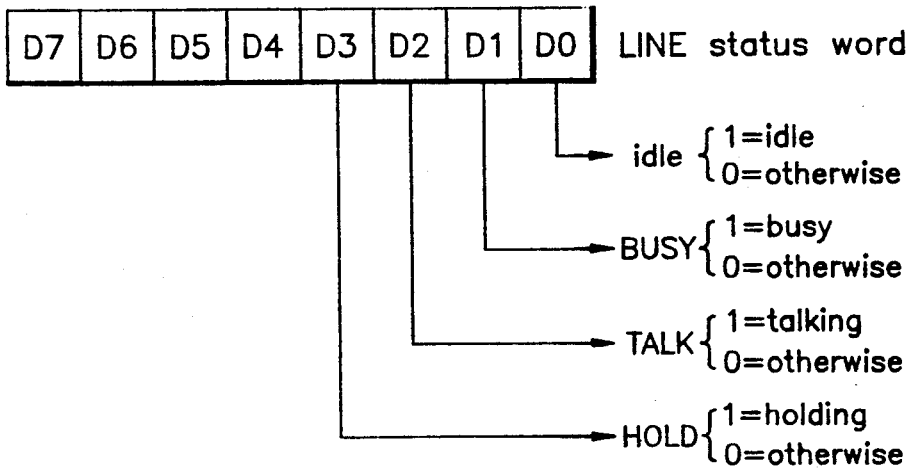

With reference to FIG. 3, a call buffer records information according to progress of a call and it is allocated to each port. A line status word indicates a state of a port and comprises 4 bits. An idle bit D0 indicates whether a state of a port is idle or not and a '1' indicates a state of idle. A busy bit D1 indicates a state of a busy tone wherein one party hears a busy tone if the other party hooks on, and a '1' indicates a busy tone state. A talk bit D2 indicates a state of communication with an office line or an extension line and a '1' indicates a speech state. This invention is to recover a speech path of a pre-engaged call only for a talk state (a completely established call) on restarting a system. A hold bit D3 indicates a state of holding and a '1' indicates a holding state. A line number (Line No.) is a storage for recording a specific number allocated in hardware to each port. For example, the line number of port #1 is recorded 0, the line number of port #2 is recorded 1, and the line number of port #N is recorded N−1 likewise. An opposite port number engaged in the call is recorded in an opposite party. In a state of idle, OFF is recorded in an opposite party.

With reference to FIG. 1 through 4, an embodiment will be described as follows.

Generally there are inevitable causes for restarting a system. It is a major grade when restarting a system from power-on reset or power off-on, and a minor grade when restarting a system from a system failure occurrence on software or using a reset button.

A step 2b is performed in case of a major grade and a step 2d in case of a minor grade, after checking the restarting grade of a system in a step 2a. After initializing all hardware in step 2b and all software in the step 2c, the procedure returns to start. If the restarting grade of a system is detected to be the minor grade in the step 2a, all hardware is initialized in the step 2d and all software except for a call buffer is initialized in step 2e.

In step 2f, a variable number of port #N of the call buffer as shown in FIG. 3A is set by '1' and step 2g is performed. In step 2g, an address of the call buffer for a variable number of port #N is generated and step 2h is performed checking whether the talk bit is set. A step 2L is performed in case of a talk bit not being set and step 2i is performed in case of the talk bit being set, after checking whether the talk bit of a line status word is set or not as shown in FIG. 3 in step 2h. Step 2i detects the corresponding port number in the line number of the call buffer and step 2j is performed. In the step 2j, an opposite port number previously engaged in a call is detected from an opposite party of the call buffer and a step 2k is performed. In the step 2k, a subscriber's speech path of the call is connected by corresponding port number of the line number and the opposite port number of the opposite party. For example a table of FIG. 4A is formed for the communication between port #1 and port #2, a table of FIG. 4B is formed for the busy state of port #1 and a table of FIG. 4C is formed for the idle state of port #1. After the speech path is connected in step 2k, the port number is increased by 1 in a step 2l and step 2m is performed. The step jumps to step 2g in case of a port number not being a last one by checking the port number in the step 2m and repeats the steps 2g to 2m until detecting the last one, and returns to start in case of the last port number.

As described above, the method is to recover a pre-engaged call without disconnecting a speech path of the call especially in case of a minor restarting grade of a system due to an failure occurring on a keyphone exchange system so as to secure reliability and an improved function of a keyphone exchange system.

While the invention has been particularly shown and described with reference to the preferred embodiment of the present invention thereof, it will be understood by those skilled in the art that the foregoing and other changes in form and details may be made without departing from the spirit and scope of the present invention.

What is claimed is:

1. A method of recovering a speech path of a pre-engaged call upon restarting a keyphone exchange system after the occurrence of a system failure, comprising the steps of:
    initializing all hardware and all software except for a subscriber's table buffer of said keyphone exchange system when a predetermined restarting signal of said system is generated;
    initializing a variable number of a port in the communication control software as a given initial value;
    generating an address of a port number corresponding to said variable number of said port in said subscriber's table buffer;
    checking whether a talk bit of a line status word in a port identified by said port number is set or not, said line status word indicating status of said port;
    obtaining a subscriber's port number from a line number buffer and obtaining an opposite subscriber's port number from an opposite party if said talk bit is set, said line number buffer storing said subscriber's port number and said opposite party storing said opposite subscriber's port number; and
    forming said speech path of said call by connecting said subscriber's port number in said line number with said opposite subscriber's port number in said opposite party.

2. The method of recovering a speech path of a pre-engaged call on restarting a keyphone exchange system after the occurrence of a system failure as claimed in claim 1, further comprising the step of altering said variable number of said port to a given value and checking whether said variable number of said port is a last number or not, and, if not, performing repeatedly said connecting steps of said speech path of said call for a next port, when said talk bit is set.

3. The method of recovering a speech path of a pre-engaged call after restarting a keyphone exchange system after the occurrence of a system failure as claimed in claim 1, further comprising the step of altering said variable number of said port to a given value and checking whether said variable number of said port is a last number or not, and, if not, performing repeatedly connecting steps of said speech path of said call for a next port, after connecting said speech path of said call.

4. The method as claimed in claim 1, wherein said subscriber's table buffer is comprised of a plurality of ports and each of said plurality of ports is comprised of said line status word indicating a state of each of said plurality of ports, said line number storing said subscriber's port number, and said opposite party storing said opposite subscriber's port number.

5. The method as claimed in claim 4, wherein said line status word is comprised of an idle bit, a busy bit, a talking bit, and a hold bit.

6. The method as claimed in claim 4, wherein said line status word is comprised of:
    an idle bit for indicating whether said port is in use;
    a busy bit for indicating whether said port is engaged in a call not with said opposite subscriber's port;
    a talk bit for indicating the state of communication between said port and an office line or an extension line; and
    a hold bit for indicating whether said port is in a state of holding.

7. The method as claimed in claim 1, further comprising the step of determining a restarting grade of the keystone exchange system, a major grade occurring when restarting the system from power-on or power off-on and a minor grade occurring when restarting a system from system failure or in response to use of a reset button.

8. The method as claimed in claim 2, further comprising the step of determining a restarting grade of the keyphone exchange system, a major grade occurring when restarting the system from power-on or power off-on and a minor grade occurring when restarting a system from system failure on software or use of a reset button.

9. A method of recovering a speech path of a pre-engaged call upon restarting a keyphone exchange after occurrence of a system failure, comprising the steps of:
    recording information on the progress of each call on the system in a call buffer, including the status of the call, a line number allocated to each port and the port number of the opposite party engaged in the call;
    checking whether a given port is engaged in a call to an opposite party; and
    connecting a speech path between said given port and said opposite party if said given port is engaged in a call to said opposite party.

10. A method as claimed in claim 9, the step of recording information on the progress of each call on the system in a table buffer, further comprising the steps of:
recording the state of each call in a line status word comprising four bits, each bit representing an idle condition, a busy condition, a talk condition and a hold condition, respectively;
recording a specific number allocated in hardware to each port of the system; and
recording the port number of the opposing party when said given port is engaged in a call.

11. A method as claimed in claim 10, wherein the step of checking whether said given port is engaged in a call to an opposite party further comprises the step of checking the talk bit of said line status word.

12. A method as claimed in claim 9, wherein the step of connecting a speech path between said given port and said opposite party further comprises the steps of:
detecting the port number corresponding to said line number;
detecting the opposite port number of said opposite party.

13. A method as claimed in claim 11, wherein the step of connecting a speech path between said given port and said opposite party further comprises the steps of:
detecting the port number corresponding to said line number; and
detecting the opposite port number of said opposite party.

14. A method as claimed in claim 9, further comprising the steps of:
initializing all hardware; and
initializing all software except for said call buffer.

15. A method as claimed in claim 13, further comprising the steps of:
initializing all hardware; and
initializing all software except for said call buffer.

16. A method as claimed in claim 9, further comprising the steps of:
incrementing the port number to produce an incremented port number; and
determining whether to continue connecting speech paths between ports and opposite parties in dependence upon whether said incremented port number is a last number.

17. A method as claimed in claim 15, further comprising the steps of:
incrementing the port number to produce an incremented port number; and
determining whether to continue connecting speech paths between ports and opposite parties in dependence upon whether said incremented port number is a last number.

18. A keyphone exchange system for recovering a speech path of a per-engaged call upon restarting of said keyphone exchange system after occurrence of a system failure comprising:
an extension subscriber matching means for detecting hook on/off status of an extension subscriber's telephone, and for supplying a current to said extension subscriber's telephone;
memory means for accessing and recording data carried by a control signal;
control processing means for generating command signals and said control signal, said control signal allocating a time slot according to signalling information from said extension subscriber matching means and accessing said memory means;
complex frequency receiver means for converting a dialed signal, from the extension subscriber telephone connected to said subscriber matching circuit, into an altered signal for transmission to said control processing means;
complex frequency transmitter means for generating a dual tone multifrequency in response to digit data output of said control processing means;
switching circuit means for connecting a speech path of an office line with said extension subscriber matching means in response to said command signals; and
office line matching means for interfacing an office line with said switching circuit means.

19. A keyphone exchange system as claimed in claim 18, further comprising a tone generator for supplying a plurality of tones to extension line subscriber telephones and office line subscribers through said switching circuit means.

* * * * *

UNITED STATES PATENT AND TRADEMARK OFFICE
CERTIFICATE OF CORRECTION

PATENT NO. : 5,200,990
DATED : April 6, 1993
INVENTOR(S) : Seung-Hwan Cho

It is certified that error appears in the above-indentified patent and that said Letters Patent is hereby corrected as shown below:

Column 2,  Line 67,  Preceding "step", Delete "the" ;

Column 3,  Line 8,   Delete "A", Change "step" to --Step-- ;

Line 9,   Change "2L" to --2l-- ;

Line 14,  Preceding "step", Delete "the" ;

Line 34,  Change "an" to --any-- .

Column 6,  Line 12,  Change "per" to --pre-- .

Signed and Sealed this

Twenty-fifth Day of October, 1994

Attest:

BRUCE LEHMAN

*Attesting Officer*   *Commissioner of Patents and Trademarks*